(12) United States Patent
Sahai

(10) Patent No.: US 8,249,927 B2
(45) Date of Patent: Aug. 21, 2012

(54) COMPUTER-IMPLEMENTED METHOD AND SYSTEM OF TRACKING AND AUTOMATICALLY MAKING PAYMENTS FOR RECYCLABLE ITEMS DEPOSITED AT REVERSE VENDING MACHINES

(75) Inventor: Shanker Sahai, Somerville, MA (US)

(73) Assignee: Greenbean Recycle, Inc., Somerville, MA (US)

( * ) Notice: Subject to any disclaimer, the term of this patent is extended or adjusted under 35 U.S.C. 154(b) by 64 days.

(21) Appl. No.: 12/860,368

(22) Filed: Aug. 20, 2010

(65) Prior Publication Data

US 2011/0055059 A1    Mar. 3, 2011

Related U.S. Application Data

(60) Provisional application No. 61/275,477, filed on Aug. 31, 2009.

(51) Int. Cl.
*G06Q 30/00* (2012.01)
*G06Q 40/00* (2012.01)
*G06F 7/00* (2006.01)
*G06F 17/00* (2006.01)

(52) U.S. Cl. ...... 705/14.11; 705/14.1; 705/39; 700/213; 700/241

(58) Field of Classification Search .......................... None
See application file for complete search history.

(56) References Cited

U.S. PATENT DOCUMENTS

| | | | |
|---|---|---|---|
| 7,395,241 B1 * | 7/2008 | Cook et al. | 705/39 |
| 2006/0178933 A1 * | 8/2006 | FitzGerald et al. | 705/14 |
| 2007/0050083 A1 * | 3/2007 | Signorelli et al. | 700/241 |
| 2008/0041996 A1 * | 2/2008 | Shaw et al. | 241/236 |
| 2009/0216593 A1 * | 8/2009 | Gonen et al. | 705/7 |
| 2009/0281892 A1 * | 11/2009 | Deakin et al. | 705/14.38 |

FOREIGN PATENT DOCUMENTS

WO    WO 97/46985    * 12/1997

OTHER PUBLICATIONS http://www.bottlebill.org/about/whatis.htm, "What is a bottle bill?" Accessed on May 17, 2011.
http://greenopolis.com/, accessed on Aug. 20, 2010.

* cited by examiner

*Primary Examiner* — Asfand Sheikh
*Assistant Examiner* — Allen Chein
(74) *Attorney, Agent, or Firm* — Brian M. Dingman; Mirick, O'Connell, DeMallie & Lougee, LLP

(57) ABSTRACT

A method and system are provided for automatically making payments for recyclable items deposited at reverse vending machines. The method includes the steps of: (a) creating a user recycling record accessible by a server computer system for each of a plurality of users and associating each user's record with a unique user identifier; (b) receiving data in real time at the server computer system from a plurality of reverse vending machines over a communications network, the data relating to deposits of recyclable items by users at the reverse vending machines, the data for each deposit by a user including the unique user identifier of the user and information on the recyclable items deposited; (c) from the data for each deposit by a user identifying the user recycling record associated with the unique user identifier and crediting the user recycling record based on the information on the recyclable items deposited by the user using the server computer system; and (d) for each deposit by a user, issuing a request to have a financial institution to make a specified electronic payment based on the recyclable items deposited by the user.

3 Claims, 2 Drawing Sheets

COMPUTER-IMPLEMENTED METHOD AND SYSTEM OF TRACKING AND AUTOMATICALLY MAKING PAYMENTS FOR RECYCLABLE ITEMS DEPOSITED AT REVERSE VENDING MACHINES

CROSS REFERENCE TO RELATED APPLICATION

This application claims priority from U.S. Provisional Patent Application Ser. No. 61/275,477, filed on Aug. 31, 2009, entitled GREEN BEAN RECYCLING SOFTWARE AND WEBSITE, which is hereby incorporated by reference.

BACKGROUND

The present application relates generally to methods and systems for making payments for recyclable items such as beverage containers deposited at reverse vending machines.

Container deposit laws also known as "bottle bills" require consumers to pay a small refundable deposit on containers (such as beer, soft drink, and other beverage containers) they purchase to improve the rate of recycling or reuse.

Bottle bills in most states typically work as follows. When a retailer buys beverages from a distributor, the retailer pays a deposit to the distributor for each can or bottle purchased. The consumer pays the deposit to the retailer when buying the beverage. When the consumer returns the empty beverage container to the retail store, a redemption center, or a reverse vending machine, the deposit is refunded. The retail store or redemption center recoups the deposit from the distributor, typically along with an additional handling fee to help cover the cost of handling the containers.

As used herein, the term "distributor" refers to a product maker (e.g., the company producing the product such as the Coca-Cola Company) or to an entity distributing products from a product maker to retailers.

Reverse vending machines are automated machines that accept used beverage containers and return container deposits to users. Manufacturers of reverse vending machines include Tomra, Wincor Nixdorf, Envipco, Repant, reVend, and Can and Bottle Systems.

In use, the user places the empty beverage container into a receiving aperture of the reverse vending machine. The reverse vending machine automatically identifies the beverage container, e.g., by scanning the beverage container's UPC code. Eligible containers are accepted, and the user is paid. The user is typically given a receipt that can be redeemed at a retailer checkout station. Accepted containers are typically crushed or broken in the reverse vending machines to reduce their size.

BRIEF SUMMARY OF EMBODIMENTS OF THE INVENTION

In accordance with one or more embodiments, a method is provided for automatically making payments for recyclable items deposited at reverse vending machines. The method includes the steps of: (a) creating a user recycling record accessible by a server computer system for each of a plurality of users and associating each user's record with a unique user identifier; (b) receiving data in real time at the server computer system from a plurality of reverse vending machines over a communications network, the data relating to deposits of recyclable items by users at the reverse vending machines, the data for each deposit by a user including the unique user identifier of the user and information on the recyclable items deposited; (c) from the data for each deposit by a user identifying the user recycling record associated with the unique user identifier and crediting the user recycling record based on the information on the recyclable items deposited by the user using the server computer system; and (d) for each deposit by a user, issuing a request to have a financial institution to make a specified electronic payment based on the recyclable items deposited by the user.

In accordance with one or more embodiments, a system is provided for automatically making payments for recyclable items deposited by users. The system includes a plurality of reverse vending machines for receiving recyclable items from users. The system also includes a server computer system in communication with each of the plurality of reverse vending machines over a communications network. The server computer system is configured to: (a) create a user recycling record accessible to each of a plurality of users, each user's record being associated with a unique user identifier; (b) receive data in real time from the plurality of reverse vending machines, the data relating to deposits of recyclable items by users at the reverse vending machines, the data for each deposit by a user including the unique user identifier of the user and information on the recyclable items deposited; (c) from the data for each deposit by a user, identify the user recycling record associated with the unique user identifier and credit the user recycling record based on the information on the recyclable items deposited by the user; and (d) issue a request to have a financial institution make a specified payment based on the recyclable items deposited by each user.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

DETAILED DESCRIPTION

The present application is generally directed to a method and system for tracking and automatically making payments for recyclable items deposited by users at reverse vending machines. The reverse vending machines are configured for collecting data on recyclable items deposited by the users and transmitting the data to a server computer system. The server computer system associates data on the recyclable items deposited by users with their user accounts and causes payments to be made based on the items deposited. Payments can be made directly to a bank account of the user or to some other account designated by the user, e.g., the account of a charity or environmental organization. The system tracks the recyclable items deposited at the reverse vending machines, and allows users to monitor their recycling activities and environmental impact through a website hosted by the server computer system. The system also allows distributors to gather real-time data on the return of their used containers.

Figure 1:
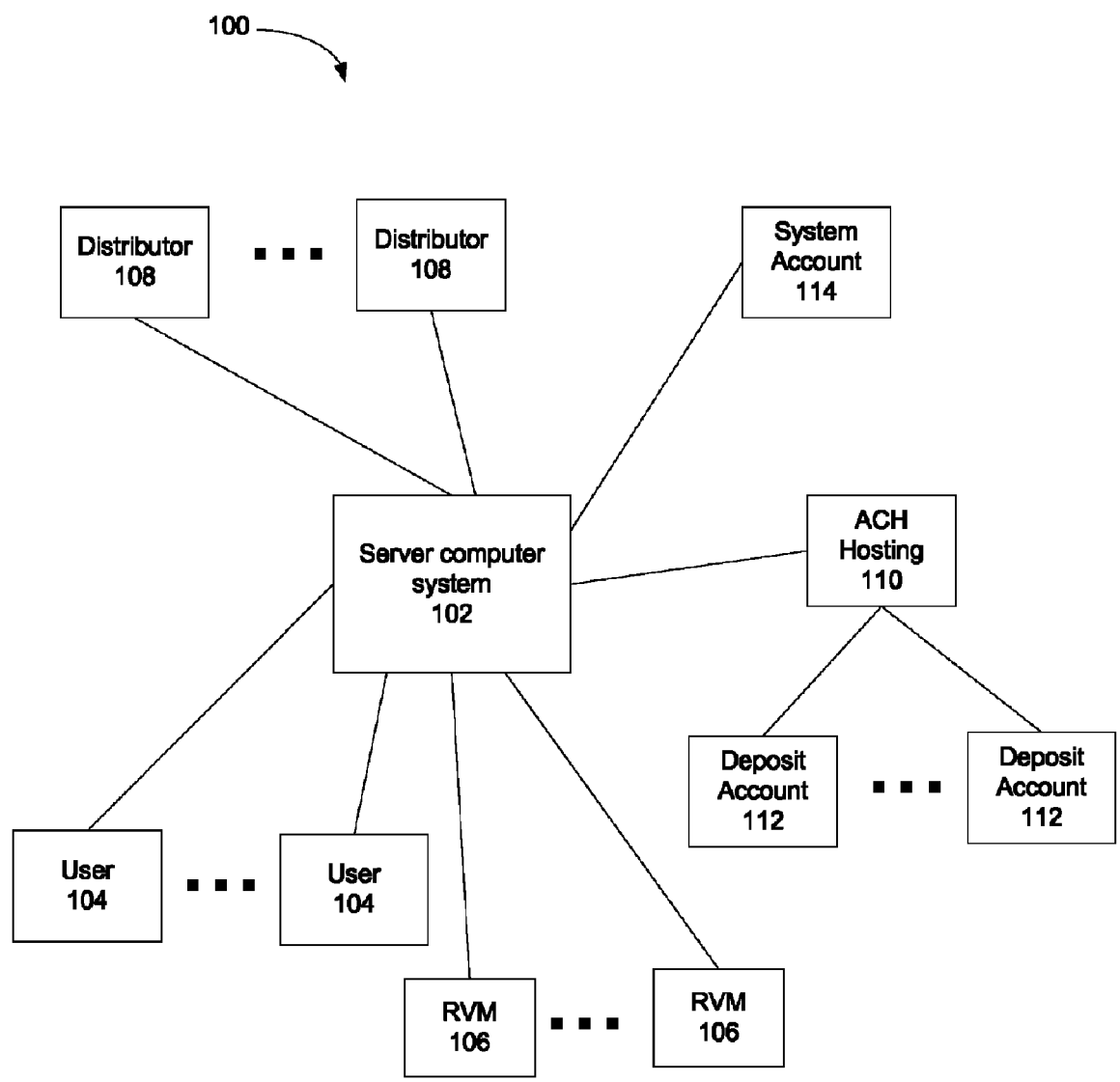
FIG. 1 is a schematic block diagram illustrating a system for tracking and automatically making payment for recyclable items deposited at reverse vending machines in accordance with one or more embodiments.

FIG. 1 schematically illustrates a system 100 for tracking and automatically making payments for recyclable items deposited by users in accordance with one or more embodiments. The system 100 includes a server computer system 102 that communicates with a plurality of users 104, reverse vending machines 106, and distributors 108 over a network.

The network may be a network or a combination of networks including, without limitation, the Internet, a local area network, a wide area network, a wireless network, and a cellular network. Users of the system 100 can communicate with the server computer system using a computing device such as, e.g., a personal computer, a workstation, a cell phone, a smart phone, a mobile device, or any other type of computing apparatus capable of communicating with the server computer system. In a preferred embodiment, the server computer system includes a web server that hosts one or more websites that are accessible by users and distributors over the Internet.

The system also preferably includes an Automated Clearing House (ACH) hosting system 110, which stores user bank account information and deposits payments for recyclable items deposited into bank accounts 112 of users and designated entities. As discussed in further detail below, distributors make payments to a system account 114 in order to pay for items deposited by users at the reverse vending machines 106. Funds from the system account are transferred to the ACH hosting system to be distributed to user and other accounts.

Reverse vending machines are known to include data reporting functionality. For example, reverse vending machines and collect information on the health and capacity of the equipment as well as data on the UPC codes of accepted beverage containers. This information is communicated over a wired or wireless communications network to a management system. Reverse vending machines 106 in accordance with various embodiments herein are configured, preferably by software, to collect and transmit a variety of data to the server computer system 102. By way of non-limiting example, the reverse vending machines 106 can comprise a reverse vending machine manufactured by companies such as Tomra, Wincor Nixdorf, Envipco, Repant, reVend, and Can and Bottle Systems having a processor configured by software to perform the functions described herein.

The server computer system 102 comprises one or more computers having one or more processors and a computer readable storage medium such as, without limitation, a computer hard-drive or removable drive or memory. One or more computer programs having executable instructions for performing the functions described herein may be stored on the computer readable storage medium.

Figure 2:
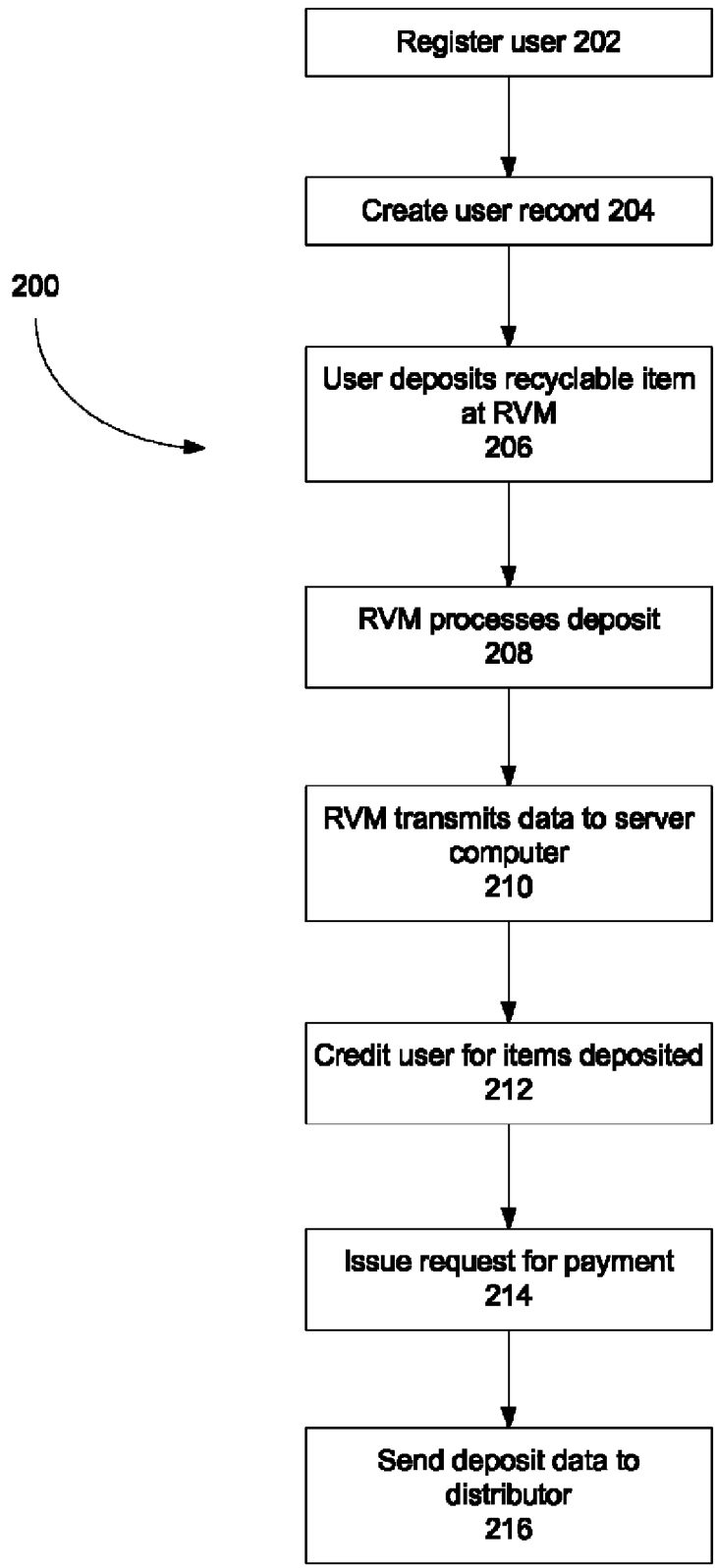
FIG. 2 is a simplified flowchart illustrating a method of tracking and making payment for recyclable items in accordance with one or more embodiments.

FIG. 2 is a simplified flowchart 200 illustrating a method for tracking and automatically making payments for recyclable items deposited by users in accordance with one or more embodiments.

At step 202, a new user registers with the system preferably through a website hosted by the server computer system 102. The user is assigned a unique user identifier. The unique user identifier can be, e.g., the user's telephone number or other number selected by the user or a number assigned by the server computer system 102.

At step 204, the server computer system 102 creates a record for each user including the user's unique user identifier number. The user record is stored in a database accessible by the server computer system 102. Information on recyclable items deposited by the user will be stored in the user's record.

If the user wishes to receive payment for recyclable items deposited, he or she also inputs bank account information (a bank routing number and account number) to which payment will be electronically deposited. The user identifier number is associated with the user bank account information. In one or more preferred embodiments, user bank account information is not stored by the system. Instead, user bank account information and associated user identifier information is stored by a third party secure ACH hosting service such as, e.g., ACH-DIRECT. Alternatively, users can specify other payment accounts to which payment will be electronically made. Examples of such other payment accounts include, but are not limited to, PayPal.

If a user does not wish to receive payment for recyclable items deposited, he or she can designate one or more organizations (e.g., charitable or environmental organizations) to receive payment for user container deposits.

At step 206, a user who has previously registered with the system deposits recyclable items at a reverse vending machine 106. The user enters the user identifier number on a keypad or other input device at the reverse vending machine 106. Alternately, the user can use a "tap and go" or other identifying card or device that can be read by the reverse vending machine 106 to determine the user identifier number.

At step 208, the reverse vending machine 106 processes the recyclable items deposited by the user. The reverse vending machine 106 identifies the recyclable item, e.g., by scanning the item's UPC code. The reverse vending machine 106 sorts accepted items and may crash or break them to optimize storage.

At step 210, the reverse vending machine 106 transmits information on the deposit made by the user to the server computer system 102. In particular, the information includes the user identifier number and identifies the recyclable items deposited and the quantity of each item. The information can optionally further include the recyclable item material (e.g., glass or aluminum), the product brand of the item, the geographic location of the reverse vending machine, and the time the item was deposited.

At step 212, the server computer system 102 processes the information received from the reverse vending machine 106. In particular, the server computer system 102 matches the user identifier number received from the reverse vending machine 106 with the user record stored in the database. The server computer system 102 stores information on the recyclable items deposited in the user record.

At step 214, the server computer system 102 initiates a process to make payment for the items deposited by the user to the user's bank account (if the user requested payment to a user bank account) or to a bank account of an organization designated by the user. If a secure ACH hosting service is utilized, the server computer system 102 transmits information including the user identifier number and the amount to be paid to the ACH hosting service. The ACH hosting service matches the user identifier information with stored information on the user bank account or designated charitable organization bank account, and makes a deposit to that bank account.

At step 216, the server computer system 102 notifies the distributor of the amount to be paid for the recyclable items deposited by the user. The distributor provides payment for that amount (optionally along with a container handling fee) to the system bank account. Funds from the system bank account are transferred to the secure ACH hosting service to be used to make payments to user bank accounts.

At any time, the server computer system 102 can provide information to users on their recycling activities. This information is preferably displayed on a website hosted by the server computer system 102. Information can include historical data on recyclable items deposited, including the number and types of containers. In addition, the information can include environmental impact information such as the mass of material diverted from landfills were the items not recycled. The information can be displayed in the form of text and/or graphs, e.g., similar to usage data shown in utility bills.

The server computer system 102 also provides information to distributors on the containers of the distributor that have been returned by users. For example, the information can include the quantity and types of containers that have been returned by users, as well as information on where and when the containers were returned. The information can further include the product brand of the containers.

Reverse vending machines 106 can be installed virtually anywhere, including in public areas such as cafeterias, stadiums, beaches, sidewalks, and concert venues. Use of the reverse that the machines can reduce the cost of trash removal for the venue because crushed cans and bottles collected by the machines will be removed by recycling materials companies, typically at no cost. In some embodiments, users do not need to provide user identifier information. Items deposited by users will be credited to the venue, and payment can be made to a bank account specified by the venue. The venue can access the system website to obtain information on the items deposited.

In accordance with one or more further embodiments of the invention, the reverse vending machines each include a Wi-Fi router, which allows users operating Wi-Fi enabled wireless communications devices such as smart phones and portable computers to access the Internet through a wireless network. In accordance with one or more embodiments, only selected users are allowed to access the wireless network. By way of example, users allowed to access the wireless network must have deposited a specified minimum number of containers over a given period of time at the reverse vending machine. Restricted access to the wireless network provides an incentive for users to utilize the reverse vending machines.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The processes described above executing in the reverse vending machines 106 and server computer system 102 may be implemented in software, hardware, firmware, or any combination thereof. The processes are preferably implemented in one or more computer programs executing on a programmable computer including a processor, a storage medium readable by the processor (including, e.g., volatile and nonvolatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

The server computer system 102 may comprise one or more physical machines, or virtual machines running on one or more physical machines. In addition, the server computer system 102 may comprise a cluster of computers or numerous distributed computers that are connected by a network or the Internet.

Method claims set forth below having steps that are numbered or designated by letters should not be considered to be necessarily limited to the particular order in which the steps are recited.

What is claimed is:

1. A computer-implemented method of automatically making payments for recyclable items deposited at reverse vending machines, wherein the recyclable items comprise containers configured for holding a product produced or sold by one of a plurality of distributors, the method comprising the steps of:

(a) allowing a user to register and become a registered user, where registered users have a unique user identifier, and then creating a user recycling record accessible by a server computer system for each registered user and associating each registered user's recycling record with the unique user identifier;

(b) allowing a registered user to enter the user's unique user identifier at one of a plurality of reverse vending machines so as to access the registered user's recycling record, and receiving data in real time at the server computer system from the plurality of reverse vending machines over a communications network, the data relating to deposits of recyclable items by users at the reverse vending machines, the data for each deposit by a user including the unique user identifier of the user and information on the recyclable items deposited, wherein the information on recyclable items deposited includes the number and type of recyclable items deposited, wherein the information on recyclable items identifies the distributor associated with the recyclable items, and wherein the information on recyclable items deposited includes the geographic location where the items were deposited;

(c) from the data for each deposit by a registered user, identifying the user recycling record associated with the unique user identifier and crediting the user recycling record based on the information on the recyclable items deposited by the user using the server computer system;

(d) for each deposit by a registered user, issuing a request to have a financial institution make a specified electronic payment based on the recyclable items deposited by the user, comprising one or more of the following:

(i) transmitting unique user identifier information to an automated clearinghouse service that matches the unique user identifier information to a user's bank account information and transmits a request to the user's bank to make payment to the user's bank account;

(ii) transmitting a request to the financial institution to make payment to a bank account or payment account associated with the user; and (iii) transmitting a request to the financial institution to make payment to a bank account associated with a charitable organization designated by the user;

(e) providing data to distributors on recyclable items associated with the distributors that have been deposited at the plurality of reverse vending machines;

(f) displaying information on a registered user's recycling activity to the user on a client device operated by the user, wherein the information displayed to the user comprises a comparison of the user's recycling activity to the recycling activity of other users; and (g) wherein each reverse vending machine comprises a Wi-Fi router allowing selected users operating Wi-Fi enabled devices to access the Internet through a wireless network; granting a registered user access to the router of one of the reverse vending machines after the user has first entered the user's unique user identifier at the reverse vending machine and deposited into the reverse vending machine a specified minimum number of containers over a given time period.

2. A system for automatically making payments for recyclable items deposited by users at a plurality of reverse vending machines, wherein the recyclable items comprise containers configured for holding a product produced or sold by one of a plurality of distributors, the system comprising:

a server computer system in communication with each of the plurality of reverse vending machines over a communications network, the server computer system being configured to:

(a) allow a user to register and become a registered user, where registered users have a unique user identifier, and then create a user recycling record accessible to each registered user's recycling record being associated with the unique user identifier;

(b) allow a registered user to enter the user's unique user identifier at one of a plurality of reverse vending machines so as to access the registered user's recycling record, and receive data in real time from the plurality of reverse vending machines, the data relating to deposits of recyclable items by users at the reverse vending machines, the data for each deposit by a user including the unique user identifier of the user and information on the recyclable items deposited, wherein the information on recyclable items deposited includes the number and type of recyclable items deposited, wherein the information on recyclable items identifies the distributor associated with the recyclable items, and wherein the information on recyclable items deposited includes the geographic location where the items were deposited;

(c) from the data for each deposit by a registered user, identify the user recycling record associated with the unique user identifier and credit the user recycling record based on the information on the recyclable items deposited by the user; and (d) issue a request to have a financial institution make a specified payment based on the recyclable items deposited by each registered user, comprising one or more of the following:

(i) transmitting unique user identifier information to an automated clearinghouse service that matches the unique user identifier information to a user's bank account information and transmits a request to the user's bank to make payment to the user's bank account;

(ii) transmitting a request to the financial institution to make payment to a bank account or payment account associated with the user; and (iii) transmitting a request to the financial institution to make payment to a bank account associated with a charitable organization designated by the user;

(e) providing data to distributors on recyclable items associated with the distributors that have been deposited at the plurality of reverse vending machines;

(f) displaying information on a registered user's recycling activity to the user on a client device operated by the user, wherein the information displayed to the user comprises a comparison of the user's recycling activity to the recycling activity of other users; and (g) wherein each reverse vending machine further comprises a Wi-Fi router allowing selected users operating Wi-Fi enabled devices to access the Internet through a wireless network; granting a registered user access to the router of one of the plurality of reverse vending machines after the user has first entered the user's unique user identifier at the reverse vending machine and deposited into the reverse vending machine a specified minimum number of containers over a given time period.

3. A system for automatically making payments for recyclable items deposited by users, wherein the recyclable items comprise containers configured for holding a product produced or sold by one of a plurality of distributors, the system comprising:

a plurality of reverse vending machines for receiving recyclable items from users, wherein each reverse vending machine comprises a Wi-Fi router allowing selected users operating Wi-Fi enabled devices to access the Internet through a wireless network; and a server computer system in communication with each of the plurality of reverse vending machines over a communications network, the server computer system being configured to:

(a) allow a user to register and become a registered user, where registered users have a unique user identifier, and then create a user recycling record accessible to each registered user's recycling record being associated with the unique user identifier;

(b) allow a registered user to enter the user's unique user identifier at one of a plurality of reverse vending machines so as to access the registered user's recycling record, and receive data in real time from the plurality of reverse vending machines, the data relating to deposits of recyclable items by users at the reverse vending machines, the data for each deposit by a user including the unique user identifier of the user and information on the recyclable items deposited, wherein the information on recyclable items deposited includes the number and type of recyclable items deposited, wherein the information on recyclable items identifies the distributor associated with the recyclable items, and wherein the information on recyclable items deposited includes the geographic location where the items were deposited;

(c) from the data for each deposit by a registered user, identify the user recycling record associated with the unique user identifier and credit the user recycling record based on the information on the recyclable items deposited by the user; and (d) issue a request to have a financial institution make a specified payment based on the recyclable items deposited by each registered user, comprising one or more of the following:

(i) transmitting unique user identifier information to an automated clearinghouse service that matches the unique user identifier information to a user's bank account information and transmits a request to the user's bank to make payment to the user's bank account;

(ii) transmitting a request to the financial institution to make payment to a bank account or payment account associated with the user; and (iii) transmitting a request to the financial institution to make payment to a bank account associated with a charitable organization designated by the user;

(e) providing data to distributors on recyclable items associated with the distributors that have been deposited at the plurality of reverse vending machines;

(f) displaying information on a registered user's recycling activity to the user on a client device operated by the user, wherein the information displayed to the user comprises a comparison of the user's recycling activity to the recycling activity of other users; and (g) granting a registered user access to the router of one of the plurality of reverse vending machines after the user has first entered the user's unique user identifier at the reverse vending machine and deposited into the reverse vending machine a specified minimum number of containers over a given time period.

* * * * *